Aug. 31, 1943.    W. H. KIDD    2,328,460
DENSITY MEASURING APPARATUS
Filed Nov. 25, 1940    2 Sheets-Sheet 1
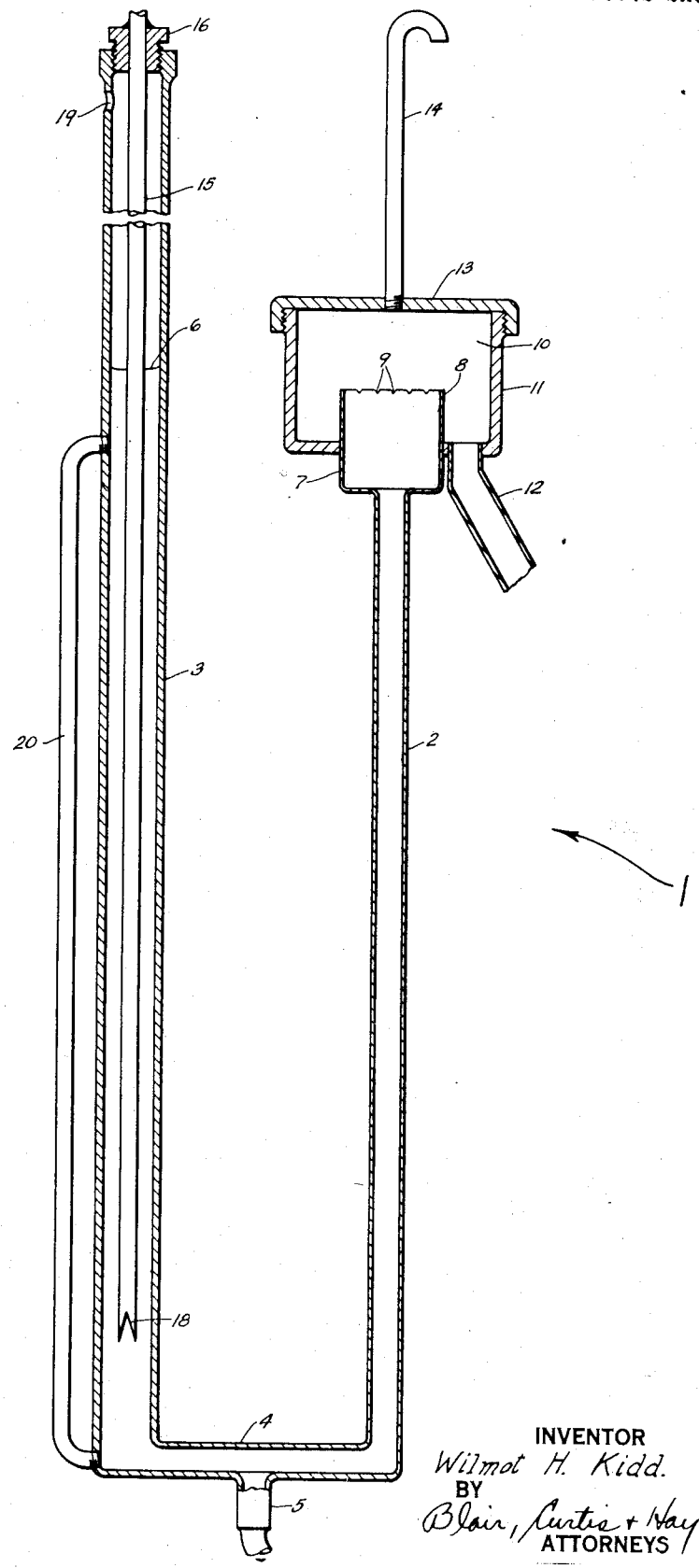

Aug. 31, 1943.  W. H. KIDD  2,328,460
DENSITY MEASURING APPARATUS
Filed Nov. 25, 1940  2 Sheets-Sheet 2
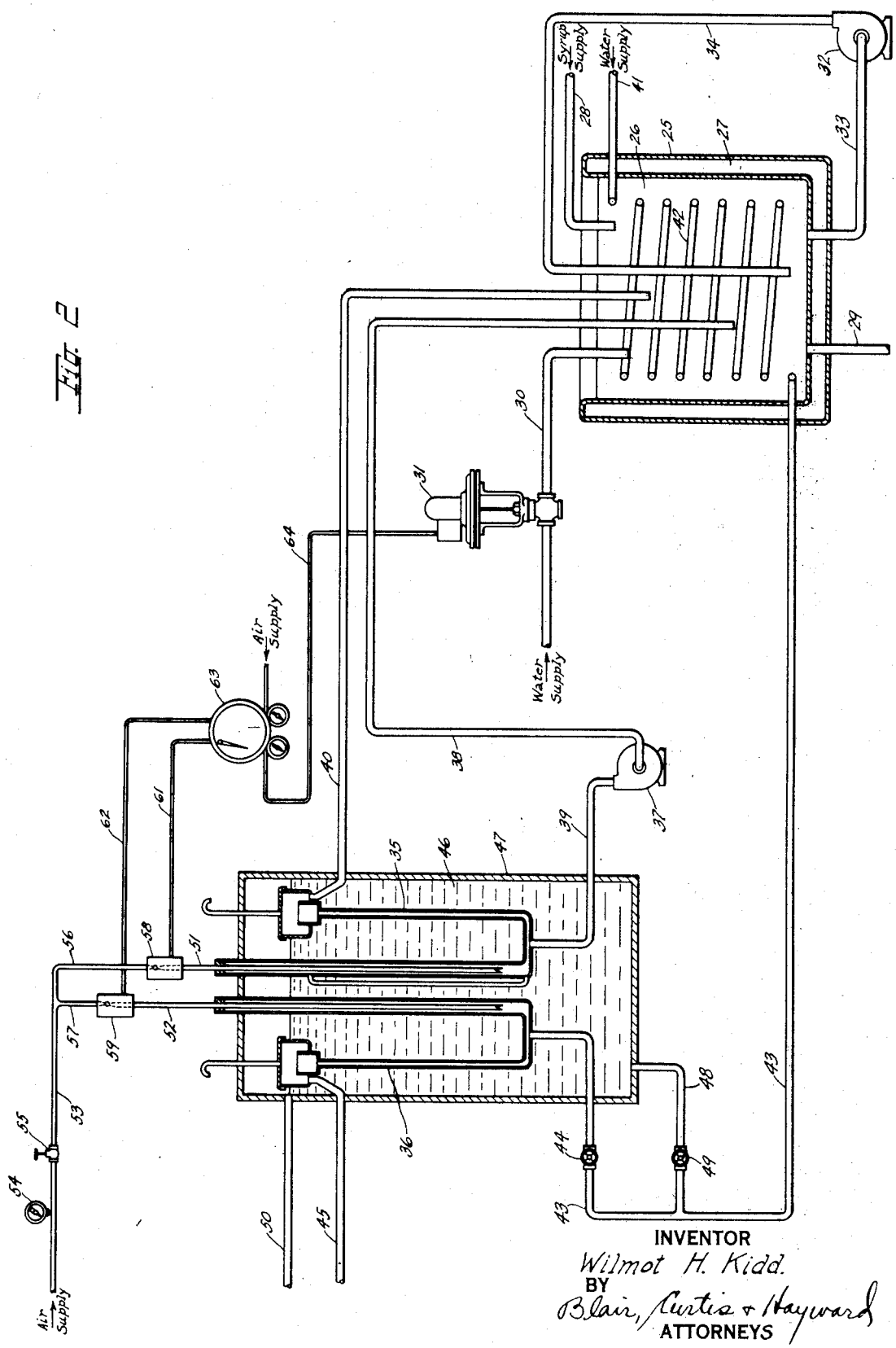
INVENTOR
Wilmot H. Kidd.
BY
Blair, Curtis & Hayward
ATTORNEYS Patented Aug. 31, 1943

2,328,460

UNITED STATES PATENT OFFICE 2,328,460

DENSITY MEASURING APPARATUS

Wilmot H. Kidd, Sharon, Mass., assignor to The Foxboro Company, Foxboro, Mass., a corporation of Massachusetts Application November 25, 1940, Serial No. 367,070

10 Claims. (Cl. 265—44)

This invention relates to apparatus for measuring and indicating, recording or controlling the density or specific gravity of a liquid, liquid mixture or suspension of solids in a liquid, all of which are herein referred to as liquids.

In one type of apparatus which has heretofore been used for this purpose, the liquid of which the density is to be determined is caused to flow into and through a suitable chamber so constructed that liquid continually overflows from the chamber to maintain in the chamber a predetermined level of liquid and hence a column of liquid of predetermined height. Air is supplied to a point near the bottom of the column of liquid under a pressure sufficient to cause a continuous relatively slow flow of air into the liquid in such a manner that bubbles are formed which rise to the surface of the liquid. Under such circumstances the pressure of the air supplied substantially balances the weight of the column of liquid between the point of overflow and the point of admission of air and hence the air supply pressure is a measure of the density of the liquid. This method is commonly known as the "air flow" method of measuring density or specific gravity.

In apparatus of this type it is evident that when a change in density occurs in the liquid entering the measuring chamber a certain period of time will elapse before the entire column of liquid being measured attains this new density, and the time required for the column as a whole to attain the new density will, for any given volume of throughput, be a function of the diameter of the measuring chamber. In order to obtain desired results with such apparatus, particularly where the apparatus is embodied in a controller to control the density or specific gravity of a flowing liquid, it is desirable that the diameter of the measuring chamber be made as small as practicable.

However, when the diameter of the measuring chamber is reduced to a relatively small value, other difficulties may result. As the diameter of the measuring chamber is reduced for a given volume of throughput, the velocity of flow of the liquid in the measuring chamber increases and at relatively small diameters the flow of liquid past the lower end of the bubble tube may exert an undesirably large effect on the air pressure within the tube and hence introduce an error into the density measurement. Under certain circumstances, a further error may be introduced due to the air lift effect caused by the air bubbles rising in the liquid. These air bubbles in the liquid tend to reduce its apparent density and for relatively small diameters of the measuring chamber may introduce an undesirably large error in measurement. In some cases the flowing fluid may comprise a mixture of liquids having different volatilities such as, for example, alcohol and water and the air bubbling upward through the liquid may tend to preferentially volatilize the more volatile constitutent, thus changing the composition of the liquid and hence its density.

It is an object of the present invention to provide an improved apparatus for measuring the density or specific gravity of a liquid which will overcome, among others, the difficulties mentioned above. The many objects and advantages of the present invention may best be appreciated by referring to the accompanying drawings which illustrate one embodiment of the invention and wherein:

Figure 1 is a diagrammatic illustration of a measuring chamber embodying the present invention; and Figure 2 illustrates the use of the measuring chamber of Figure 1 to control the specific gravity of a sugar syrup.

Referring now to the drawings, and particularly to Figure 1, there is shown a U-shaped measuring chamber generally designated by the numeral 1 and comprising a constant level leg 2, a bubble leg 3, and a connecting passage or conduit 4. A sample of the liquid of which the density is to be measured is continuously supplied through a pipe 5 to the conduit 4, passes upwardly through the constant level leg 2, and overflows at the top of the leg 2. Liquid also rises in bubble leg 3 to some level such as 6 where the column of liquid in the bubble leg balances the column of liquid in the constant level leg and the hydrostatic head in the two legs is the same.

At its upper end the constant level leg 2 is provided with an overflow cup 7 of enlarged diameter and having an upper periphery which forms an overflow lip 8. The liquid sample flowing upwardly in the constant level leg 2 flows into overflow cup 7 and then over the lip 8 which may, if desired, be provided with a series of V-notches 9.

The overflow cup 7 is made larger in diameter than the constant level leg 2 to reduce the velocity of the flowing liquid as it approaches the overflow lip 8. As described above, when the diameter of constant level leg 2 is made relatively small for a given volume of throughput, the liquid velocity increases; and if the diameter of the constant level leg were not increased at the point of overflow, the flowing liquid might tend to jet or spew upwardly from the end of the tube. With the construction shown, the liquid approaches the overflow lip at a reduced velocity and hence flows smoothly and evenly over the lip. Thus the overflow level of the liquid and hence the height of the column of liquid in the leg 2 may be more accurately maintained and is less subject to change with changes in the rate of flow of the sample through the apparatus.

Since the overflow level of the constant level leg 2 remains practically constant, substantially the only variations in the hydrostatic head in this leg will be those due to variations in the density of the flowing liquid. Furthermore, since the hydrostatic head in bubble leg 3 is always equal to the hydrostatic head in constant level leg 2, variations in density in the liquid flowing in leg 2 will produce corresponding variations of the hydrostatic head in leg 3.

The upper portion of overflow cup 7 is enclosed in a chamber 10 formed by a casing 11 and a cap 13, the cap being provided with a vent pipe 14. Liquid from the leg 2 flows over the lip 8 into the chamber 10 and leaves the chamber through an outlet pipe 12. The liquid leaving the chamber 10 through outlet pipe 12 may be returned to the main body of liquid, and cap 13 is provided to prevent the liquid from becoming contaminated with dust or dirt.

The hydrostatic head in bubble leg 3 is measured by conducting air or other gas under pressure to a point near the bottom of the column of liquid in the leg and measuring the air pressure required to balance the hydrostatic head above that point. Partially immersed in the liquid in leg 3 there is a bubble tube 15 which, at the top of the leg 3, is suitably supported as by a bushing 16 threaded into the top of the leg. At its lower end the tube 15 is provided with a notch 18 as shown. The amount of submersion of the bubble tube depends upon the desired measuring range of the apparatus and the extent of immersion of the tube may be varied to give desired measuring ranges. The tube 15 receives air or other gas from a suitable source and under such a pressure as to cause the air to flow from the lower end of the tube and to continuously bubble upward through the liquid in the leg 3. Near its upper end the leg 3 is provided with one or more vents 19 to permit egress of this air. In some cases, as for example where the liquid being measured is relatively viscous, it may be desirable to provide the bubble leg 3 with a circulation leg 20 to promote circulation of the liquid in the bubble leg.

The operation of the measuring chamber 1 is as follows: When air is supplied to the bubble tube 15 under such a pressure as to cause the air to bubble slowly from the lower end of the bubble tube, the pressure within the tube is a measure of the weight of the column of liquid in the bubble leg. Since the column of liquid in the bubble leg balances the column of liquid in the constant level leg 2, this air pressure is also a measure of the weight of the column of liquid in the constant level leg. As pointed out above, the column of liquid in constant level leg 2 is maintained at a predetermined constant height. Hence the air pressure in bubble tube 15 is also a measure of the density of the liquid in constant level leg 2 and more particularly is a measure of the density of the column of liquid between overflow lip 8 and a point in leg 2 opposite the top of notch 18. Any suitable and well known pressure-responsive device may be used to measure this air pressure and indicate the density of the measured liquid.

With the construction shown, the difficulties mentioned above are overcome. There is substantially no flow of the liquid sample past the lower end of the tube 15 and hence there is no pitot or impact effect on the open end of this tube to alter the air pressure within the tube and introduce an error into the measurement. Any variation which may occur in the density of the liquid in the bubble leg 3, either due to the air lift effect of the bubbles or to the volatilization of volatile components of the liquid are, in effect, automatically cancelled out by corresponding variations in the level 6. If, for example, the density of the liquid in the leg 3 becomes less than the density of the liquid in the leg 2, the level 6 will rise until the weight of the liquid column in bubble leg 3 balances the weight of the column of liquid in the leg 2; the height of the column in the leg 2 is, of course, predetermined by the position of overflow lip 8 with respect to the bottom of the leg 2. Thus the air pressure in the bubble tube 15 will be the same for a given density in the constant level leg 2, irrespective of what the density of the liquid is in the bubble leg 3 and variations in density of the liquid in leg 3 will introduce no errors in measurement.

Referring now to Figure 2, which shows diagrammatically the device of Figure 1 embodied in a control system adapted to control the specific gravity of a sugar syrup, there is shown at the right-hand portion of Figure 2 a steam jacketed kettle 25 comprising a heating chamber 26 and a steam jacket 27. The heating chamber 26 of the kettle 25 is continuously supplied through a pipe 28 with a concentrated syrup from a suitable source (not shown) and syrup is continually withdrawn from the kettle 25 through an outlet pipe 29. The steam jacket 27 of the kettle is supplied with steam from a suitable source (not shown). Water for diluting the concentrated syrup flowing into the kettle 25 is supplied through a pipe 30 provided with a pneumatically operated control valve 31 and adequate mixing of the diluting water with the syrup in the kettle may be accomplished by any suitable means such as by a circulating system comprising a circulating pump 32 which continuously withdraws syrup from the kettle through a pipe 33 and returns it to the kettle through a pipe 34. The measuring and control apparatus shown in the left-hand portion of Figure 2 maintains the specific gravity of the syrup in the kettle 25 at a desired value by regulating the supply of diluting water flowing through the pipe 30 in a manner which will now be described.

Referring now to the left-hand portion of Figure 2, there are shown two measuring chambers 35 and 36 which are constructed similarly to the device of Figure 1. Measuring chamber 35 is continuously supplied with a sample of syrup from the kettle 25 by a sample pump 37 which withdraws syrup from the kettle through a pipe 38 and pumps it to the chamber 35 through a pipe 39. Overflow syrup leaving the measuring chamber 35 returns to the kettle 25 through a pipe 40.

In order to obtain a value indicative of the specific gravity of the syrup in the kettle 25, the density of the syrup in the measuring chamber 35 is compared with the density of water at the same temperature and the second measuring chamber 36 is provided for this purpose. The measuring chamber 36 is continuously supplied with heated water in the following manner. Referring again to the right-hand portion of Figure 2, water from a suitable source (not shown) is supplied through a pipe 41 to a heating coil 42 immersed in the body of syrup in kettle 25. The purpose of the coil 42 is to raise the temperature of the water to approximately that of the syrup in the kettle. From the coil 42, the heated water flows through a pipe 43 provided with a shut-off valve 44 into the measuring chamber 36. Overflow water from the chamber 36 leaves the chamber through an overflow pipe 45.

In order to further assure that the syrup in measuring chamber 35 and the water in measuring chamber 36 will be at the same temperature, the two measuring chambers are immersed in a water bath 46 in a container 47. The water bath 46 receives a continuous supply of heated water from pipe 43 through a branch line 48 provided with a shut-off valve 49 and an equivalent amount of water leaves the container 47 through an overflow pipe 50. In this way the temperature of the syrup in chamber 35 and of the water in chamber 36 are maintained at substantially the same value.

Like the measuring chamber 1 of Figure 1, the measuring chambers 35 and 36 are provided with bubble tubes 51 and 52, respectively, which receive a continuous supply of air. Air to operate the measuring chambers is supplied from a regulated supply (not shown), through a pipe 53 provided with a pressure gage 54 and pressure regulator 55 and passes through branch lines 56 and 57 to the usual restrictions 58 and 59, respectively, which are connected to the bubble tubes. The restrictions 58 and 59 may be adjustable and are usually of such size as to produce critical velocity of air flow therethrough. This critical velocity tends to prevent the air pressure in the bubble tubes from becoming appreciably greater than the hydrostatic head which it opposes.

The air pressures in the bubble tubes 51 and 52 are transmitted through pipes 61 and 62 to a suitable controller 63. The controller 63 is made responsive to the difference in pressure existing between pipes 61 and 62 and regulates the air pressure supplied through pipe 64 to control valve 31 in such manner as to regulate the flow of diluting water in pipe 30 to maintain the specific gravity of the syrup in kettle 25 at a desired value. Such controllers are well known in the art and will not be described in detail herein. The controller 63 may be of the recording or of the non-recording type as desired.

In order to utilize fully the advantages of the rapid measurement of specific gravity made possible by the present invention it will usually be desirable to make the pipe connecting the kettle 25 and measuring chambers 35 and 36 as short as practicable.

From the above description it is apparent that the present invention provides an improved apparatus for measuring and indicating, recording, or controlling the specific gravity or density of a liquid. The apparatus disclosed gives a rapid and accurate measurement of density of specific gravity and is particularly useful where the measurement is to be used as a basis for controlling the density or specific gravity of a liquid substantially at a desired constant value. Further, the present invention provides commercially practical means whereby variations in the value of specific gravity may be kept within the narrower limits than has heretofore been possible.

Since many embodiments might be made of the above invention and since many changes might be made in the embodiment disclosed, it is to be understood that all matter herein disclosed is to be construed as illustrative only and not in a limiting sense.

I claim:

1. In apparatus for measuring the density of a fluid, the combination of a first compartment adapted to receive a continuous flow of said fluid, means for effectively introducing fluid near the bottom of said first compartment, means for maintaining a column of said fluid of constant height in said first compartment, a second compartment containing a second column of fluid physically separated from but communicating with said first column of fluid, means for supplying gas to said second compartment under a pressure sufficient to balance the weight of said column of fluid, and means responsive to said gas pressure for indicating the density of said fluid.

2. In apparatus for measuring the density of a fluid, the combination of a first compartment, a source of said fluid, means for effectively supplying a sample of said fluid from said source to the bottom of said first compartment, overflow means for maintaining a column of said fluid of predetermined constant height in said first compartment, a second compartment containing a second column of fluid physically separated from said first column of fluid and connected to said fluid source, a tube having an end substantially submerged below the surface of said second column of fluid, means for supplying air to said tube at a pressure sufficient to cause air bubbles to be forced from the submerged end of said tube into said second column of fluid, and means responsive to said air pressure for indicating the density of said fluid.

3. In apparatus for measuring the density of a fluid, the combination of a conduit adapted to receive a continuous sample of said fluid and including a tubular portion of relatively small cross-sectional area and an overflow portion of relatively large cross-sectional area, said overflow portion being adapted to cause said fluid to overflow continuously and maintain a column of predetermined constant height in said conduit, means for effectively supplying said sample to said conduit near the bottom of said tubular portion a compartment communicating with said conduit and adapted to contain a quantity of said fluid sufficient to balance the column of fluid in said conduit, means for supplying gas to said compartment under pressure sufficient to balance the weight of fluid in said compartment, and means responsive to said gas pressure to indicate the density of said fluid.

4. In apparatus for measuring the density of a fluid, the combination of a first compartment adapted to receive a continuous flow of said fluid, means for maintaining a column of said fluid of predetermined constant height in said first compartment, a second compartment containing a second column of fluid physically separated from but communicating with said first column of fluid, a conduit connecting spaced points of said second compartment for assisting circulation of said fluid in said second compartment, means for supplying gas to said second compartment under a pressure sufficient to balance the weight of said second column of fluid, and means responsive to said gas pressure for indicating the density of said fluid.

5. In apparatus for measuring the specific gravity of a body of fluid, the combination of a first compartment adapted to receive a continuous sample of said fluid, means for maintaining a column of said fluid of constant predetermined height in said first compartment, a second compartment containing a second column of fluid physically separated from but communicating with said first column of fluid, means for supplying gas to said second compartment under a pressure sufficient to balance the weight of said second column of fluid, means for supplying gas under pressure to a column of water of the same predetermined height as the column of fluid in said first compartment, and means responsive to the difference in pressure of the gas supplied to said fluid column and the gas supplied to said water column to indicate the specific gravity of said body of fluid.

6. In apparatus for measuring the specific gravity of a body of fluid, the combination of a first compartment adapted to receive a continuous sample of said fluid, means for maintaining a column of said fluid of predetermined constant height in said first compartment, a second compartment containing a second column of fluid physically separated from but communicating with said first column of fluid, means for supplying gas to said second compartment under a pressure sufficient to balance the weight of said second column of fluid, means for supplying gas under pressure to a column of water of the same predetermined constant height as the height of fluid in said first compartment, means for maintaining said water column and said fluid column at substantially the same temperature, and means responsive to the difference in gas pressure between said fluid column and said water column for indicating the specific gravity of said body of fluid.

7. In apparatus for measuring the density of a fluid, the combination of a first compartment, a source of said fluid, means for continuously supplying a sample of said fluid from said source to said first compartment near the bottom of said compartment, overflow means for maintaining a column of said fluid of predetermined constant height in said first compartment, said column being exposed at its upper surface to atmospheric pressure, a second compartment containing a second column of fluid physically separated from said first column of fluid and connected to said fluid source, said second column of fluid being also exposed at its upper surface to atmospheric pressure, a tube having an end substantially submerged below the surface of said second column of fluid, means for supplying air to said tube at a pressure sufficient to cause air bubbles to be forced from the submerged end of said tube into said second column of fluid, and means responsive to said air pressure for indicating the density of said fluid.

8. In apparatus for measuring the density of a hydraulic fluid, the combination of a first compartment adapted to receive a continuous flow of said fluid and having a cross-sectional area which is small enough with respect to the rate at which said fluid is introduced into said compartment to cause the density of the fluid in said compartment to rapidly assume the density of the incoming fluid, means for effectively introducing fluid near the bottom of said first compartment, means for maintaining a column of said fluid of constant height in said first compartment, a second compartment containing a second column of fluid physically separated from but communicating with said first column of fluid, means for supplying gas to said second compartment near the bottom of said compartment and under a pressure sufficient to balance the weight of said second column of fluid, and means responsive to said gas pressure for indicating the density of said fluid.

9. In apparatus for measuring the density of a hydraulic fluid, the combination of a first compartment adapted to receive a continuous flow of said fluid, means for effectively introducing fluid near the bottom of said first compartment including a supply conduit having a cross-sectional area approximately equal to the cross-sectional area of said first compartment, the cross sectional area of said first compartment being relatively small with respect to the volume of said compartment, means for maintaining a column of said fluid of constant height in said first compartment, a second compartment containing a second column of fluid physically separated from but communicating with said first column of fluid, means for supplying gas to said second compartment under a pressure sufficient to balance the weight of said second column of fluid, and means responsive to said gas pressure for indicating the density of said fluid.

10. In apparatus for measuring the density of a hydraulic fluid, the combination of a first compartment adapted to receive a continuous flow of said fluid and having a volume which is relatively small with respect to the rate of flow of said fluid therethrough, means for effectively introducing fluid near the bottom of said compartment, means for maintaining a column of said fluid of constant height in said first compartment, a second compartment containing a second column of fluid physically separated from but communicating with said first column of fluid, means for supplying gas to said second compartment under a pressure sufficient to balance the weight of said second column of fluid, and means responsive to said gas pressure for indicating the density of said fluid.

WILMOT H. KIDD.

CERTIFICATE OF CORRECTION.

Patent No. 2,328,460.  August 31, 1943.

WILMOT H. KIDD.

It is hereby certified that error appears in the printed specification of the above numbered patent requiring correction as follows: Page 3, second column, line 22, claim 1, after "said" insert --second--; and that the said Letters Patent should be read with this correction therein that the same may conform to the record of the case in the Patent Office.

Signed and sealed this 4th day of January, A. D. 1944.

(Seal)

Henry Van Arsdale,
Acting Commissioner of Patents.